United States Patent [19]
Fujita et al.

[11] Patent Number: 4,831,404
[45] Date of Patent: May 16, 1989

[54] AUTOMATIC FOCUSING CAMERA

[75] Inventors: Yoshihiro Fujita, Tokyo; Kazuhiro Akiyama; Miharu Takahashi, both of Saitama, all of Japan

[73] Assignee: Fuji Photo Film Co., Ltd., Kanagawa, Japan

[21] Appl. No.: 163,472

[22] Filed: Mar. 4, 1988

[30] Foreign Application Priority Data

Mar. 4, 1987 [JP] Japan .................................. 62-49482

[51] Int. Cl.⁴ .......................... G03B 3/00; G03B 15/03
[52] U.S. Cl. .................................... 354/403; 354/413; 354/195.1
[58] Field of Search ............... 354/400, 402, 403, 412, 354/413, 127.13, 195.1, 195.13, 266

[56] References Cited
U.S. PATENT DOCUMENTS 4,300,823  11/1981  Yamanaka et al. ................ 354/403
4,322,141   3/1982  Tominaga et al. ................. 354/403
4,501,481   2/1985  Kataoka et al. .................... 354/413

Primary Examiner—W. B. Perkey
Attorney, Agent, or Firm—Young & Thompson

[57] ABSTRACT

An automatic focusing camera is equipped with an automatic subject distance detecting device for detecting which of a plurality of predetermined distances is nearest to that at which the subject lies. A lens positioning member adjusts an objective lens to a suitable focusing position in which the objective lens has a depth of field straddling that nearest predetermined distance detected by the automatic subject distance detecting device. Another lens positioning member adjusts the objective lens to a focusing position in which the objective lens will be focused on a subject, such as a landscape, at infinity, independently of the distances detected by the automatic subject distance detecting device. The latter objective lens positioning member is externally operable when it is intended to photograph a subject at infinity, before depressing the shutter button.

8 Claims, 2 Drawing Sheets

AUTOMATIC FOCUSING CAMERA

BACKGROUND OF THE INVENTION

The present invention relates to an automatic focusing camera.

FIELD OF THE INVENTION

Numerous compact cameras are equipped with automatic focusing devices. An automatic focusing device comprises a subject distance detecting device which is caused to operate as a result of depressing a shutter releasing button so as automatically to detect a subject distance and a lens positioning mechanism for moving and positioning an objective lens at a suitable focusing position according to the detected subject distance before a shutter is actuated.

There are well known in the art various types of automatic subject distance detecting devices, for example active type or passive type automatic distance detecting devices. Active type automatic distance detecting devices which various compact cameras are equipped with are based on the principle of trigonometric range finding. For incorporating such an active type automatic distance detecting device in a compact camera, light projecting and light receiving means are provided which are spaced apart a distance equal to the base length of the automatic distance detecting device. Light projected from the light projecting means is partly reflected by a remote subject and received by the light receiving means through a lens. The optical axes of the light projecting means and the light receiving means are parallel to the optical axis of the objective lens of the camera. As the angle of incidence of light from the remote object on the light receiving means depends on the subject distance, the subject distance can be found by detecting on which one of a plurality of divisions of the light receiving means the light reflected from the object impinges.

If a subject is at an infinite distance, the reflected light incident on the light receiving means is too weak in intensity and has a very small incidence angle. For example, if it were attempted to distinguish between two subjects one at an infinite distance and the other at a finite distance greater than 10 m from the camera, the light projecting means would have to have a very strong light emission and the light receiving means would have to consist of minute divisions of light receiving elements, resulting in an expensive automatic distance detecting device.

In attempting to overcome this problem heretofore, the greatest focusing distance to which the focus of an objective lens could be automatically adjusted was for example 12 m from the objective lens, since the objective lens would be in focus on a subject at a distance between that limited finite distance, for example 12 m, and infinity, thanks to the depth of field of the objective lens.

A problem associated with the above-described automatic distance detection device is that it is unfavorable to subjects such as landscapes whose subject distances generally are infinite. This is true because, although the objective lens could focus on a subject at infinity, the farthest automatically settable focusing distance is a finite distance, for example 12 m, and so an enlarged image of the landscape at an infinite distance will be produced which will be blurred.

Another problem, which is peculiar to the active type subject distance detecting devices, is wrong distance detection. For example, when photographing a landscape at an infinite distance, from behind a transparent window glass, the automatic distance detecting device sometimes makes a wrong decision on subject distance because of reflected light from the window glass.

In general, because the depth of field of an objective lens becomes wider with distance, it is hard to detect a precise subject distance of a subject at infinity even by a focusing device rather than by an active type distance detecting device or a range finding device such as a device of the type which detects the sharpness of an image of the subject.

OBJECT OF THE INVENTION

It is, therefore, an object of the present invention to provide an automatic focusing camera in which an objective lens is reliably adjusted to infinity when photographing a subject at infinity such as a landscape.

SUMMARY OF THE INVENTION

The above and other objects of the invention can be accomplished by providing an automatic focusing camera equipped with lens positioning means for positioning an objective lens at an infinity position independently from a subject distance detected by an automatic subject distance detecting means. The lens positioning means is caused to operate by means of an externally operable member which is operated when photographing a subject at infinity such as a landscape.

According to a preferred embodiment of the present invention, when the externally operable lens positioning means is operated, the objective lens is adjusted to an infinity position to focus on a subject at infinity. Because the positioning of the objective lens to infinity is effected independently from the automatic subject distance detecting device, the objective lens can be correctly positioned at infinity without any influence of noise from the automatic subject distance detecting device, thereby providing a well focused sharp image of the subject at infinity.

BRIEF DESCRIPTION OF THE DRAWINGS

The above and other objects and features of the present invention will become apparent to those skilled in the art from the following description taken in conjunction with the preferred embodiment thereof with reference to the accompanying drawings, in which.

DETAILED DESCRIPTION OF THE INVENTION

Figure 1:
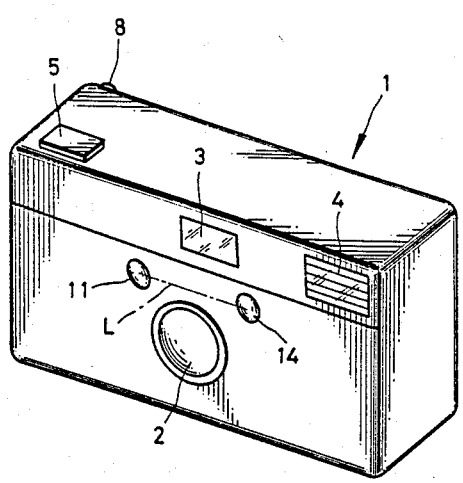
FIG. 1 is a perspective view showing an automatic focusing compact camera embodying the present invention.

Referring now to FIG. 1, there is shown a compact camera equipped with the automatic focusing device of the present invention. As shown, a camera body 1 has in its front wall an objective lens 2 centrally positioned, a finder frame window 3 above the objective lens 2, and a strobe light emitting window 4. Provided in the top wall of the camera body 1 is a shutter release button 5. All these elements are well known in the art. Above the objective lens 2 there are two lenses, namely light projecting and light detecting lenses 11 and 14, disposed on opposite sides of the objective lens 2, these lenses 11 and 14 being separated a distance equal to the base length L of an automatic range finding device which will be described in detail later. The camera body 1 is further provided on its back wall with a pushbutton 8 for setting the objective lens 2 to an infinity mode in which the objective lens 2 is focused at infinity.

Figure 2:
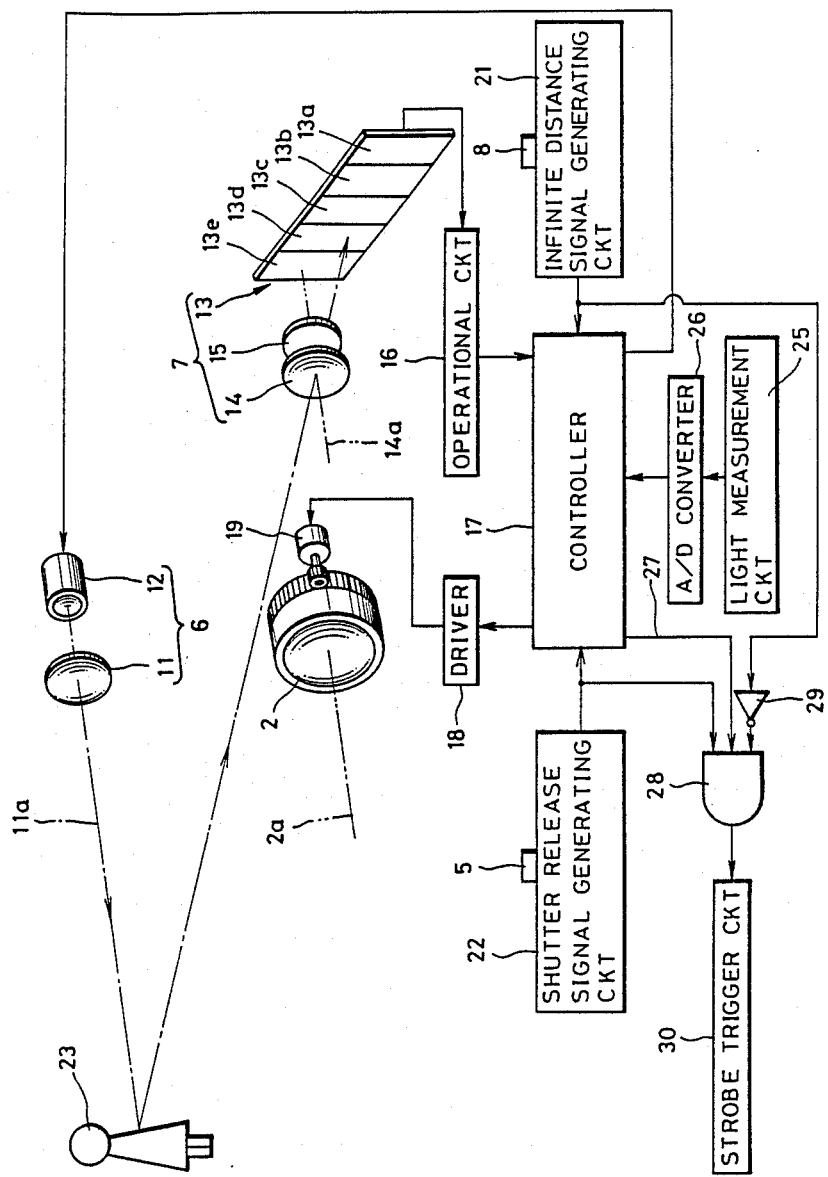
FIG. 2 is a block diagram showing the circuit used in the camera of FIG. 1.

Reference is now had to FIG. 2 illustrating the principle of the automatic focusing system according to the present invention. As shown, the automatic focusing device mainly comprises an automatic range finding device and a focusing device. The automatic range finding device includes light projecting means 6 and light detecting means 7. The light projecting device 6 has a light emitting element 12 such as an infrared light emitting diode disposed behind the light projecting lens 11 for projecting light toward a remote subject 23 to be photographed through the projecting lens 11. The optical axis 11a of the light projection lens 11 is parallel to the optical axis 2a of the objective lens 2. On the other hand, the light detecting means 7 has a color filter 15 for passing infrared light having a wavelength, for example, longer than abut 700 nm and a light sensing element 13, both of filter 15 and light sensing element 13 being disposed behind a light detecting lens 14. The optical axis 14a of lens 14 is parallel to the optical axis 11a of the light projecting lens 11, and hence the axis 2a of the objective lens 2. The light sensing element 13, which is placed in the focal plane of the objective lens 2, comprises a plurality, for example in this embodiment five, of smaller divisions of light receiving elements 13a to 13e arranged in the direction of the base length L.

An operation circuit 16 connected to the light detecting element 13 executes an operation based on a distance signal provided any one on the smaller divisions of light receiving elements 13a to 13e of the light detecting element 13 to provide a controller 17 comprising a micro- processor unit with a position signal. Upon receiving the position signal from the operation circuit 16, the controller 17 actuates a driver 18 to control the rotation of a motor 19, so as to move the objective lens 2 spirally back or forth to place it in a focused position according to the position signal.

A light measuring circuit 25 is connected to the controller 17 through an A/D converter 26. This light measuring circuit 25, which may take the form of any of known circuits including a light detecting element for effecting an automatic exposure control (AE), detects the brightness of the remote subject 23 to provide a brightness signal which in turn is sent to the controller 17 after being converted into a digital signal by the A/D converter 26. In the controller 17 the brightness signal in a digital form is subjected to a programmed operation and then sent as a light emission signal for a strobe to an AND circuit 28 through a line 27. This light emission signal has a signal level of high (H) when the brightness of the remote subject is lower than a predetermined level and artificial illumination light is needed or a signal level of low (L) when the remote subject is bright enough. Connected to the AND circuit 28 are an infinity signal generating circuit 21 through an inverter 29 and a shutter release signal generating circuit 22. The shutter release signal generating circuit 22 generates a shutter release signal of a level high (H) when the shutter release button 5 is depressed and a signal of a level low (L) when the shutter release button 5 is not depressed.

The infinity signal generating circuit 21 generates an infinity mode signal of a level high (H) when the pushbutton 8 is pushed to set the camera to the infinity mode or a signal of a level low (L) rather than the infinity mode. Therefore, the AND circuit 28 provides a signal of a level high (H) as a result of the depression of the shutter release button 5 only when the camera is set to a normal focusing mode and the remote subject is judged to have a brightness greater than the predetermined brightness by the controller 17. The high level signal from the AND circuit 28 triggers a strobe circuit 30 to deliver a flash.

Figure 3:
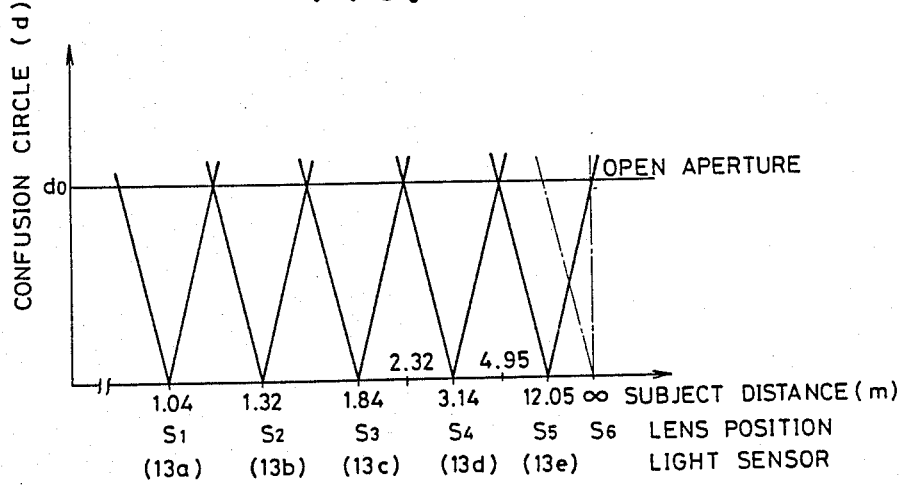
FIG. 3 is an explanatory illustration showing the relationship between suitable focusing lens position and the depth of field of an objective lens.

As is shown in FIG. 3, the objective lens 2 has five focus positions S1 to S5 corresponding to the respective light sensing elements 13a to 13e of the light detecting element 13 in the normal focusing mode and one special or infinity focus position S6 in the infinity mode. When the camera is set to the normal focusing mode, the operation circuit 16 provides the controller 17 with a position signal according to the output signal from the light detecting element 13; the controller 17 actuates the driver 19 to cause the motor 19 to rotate, so as to move the objective lens 2 to a selected one of the focus positions S1 to S5.

When the pushbutton 8 is operated to set the camera to the infinity mode, the infinity signal generating circuit 21 provides the controller 17 with an infinity focusing signal; the controller 17 actuates the driver 19 to cause the motor 19 to rotate, so as to move the objective lens 2 to the infinity focus position S6.

As is shown in FIG. 3, the objective lens 2 can be selectively adjustable to the focusing positions S1 to S5 according to the light sensing elements which receive light from the remote subject. For example, if the light receiving element 13d receives light, the objective lens 2 is adjusted to the focusing position S4, for example a subject distance of 3.14 m., When the objective lens 2 is adjusted to the focusing position S4, the objective lens 2 is in focus for any subject in a distance range between about 2.3 and 5.0 m when the aperture is fully open, owing to the depth of field of the objective lens 2.

Taking an example for easier understanding, when reflected light from the remote subject 23 is detected by the divisional light sensing element 13d of the light detecting element 13, an output from the divisional light sensing element 13d is operated by the operation circuit 16 so as to provide the controller 17 with a position signal representative of the fourth zone of the finite subject field. Correspondingly to the fourth zone position signal, the controller 17 causes the driver 18 to rotate the motor 19 so as to move the objective lens 2 to the position S4. The position S4 is, for example, the lens position in which an object 3.14 m from the camera is in focus. If in fact the objective lens 2 is focused on a subject at the distance corresponding to the position S4, the depth of field of the objective lens 2 is between 2.3 and 5 m when the aperture is fully opened. Owing to the depth of field of the objective lens 2, by positioning the objective lens in any one of the positions S1 to S5, the objective lens 2 can be well focused on a subject at any distance between the closest distance and infinity.

When the objective lens 2 is adjusted to the position S6 which is selected independently of the outputs from the light sensing elements 13a to 13e, the objective lens 2 is focused on infinity. When the objective lens 2 is adjusted to the position S6, the near end of the depth of field of the objective lens 2 is about 12 m.

In operation of the automatic focusing camera constructed and described above, the shutter button 5 is depressed half way. As is described above, as a result of the halfway depression of the shutter release button 5, a release signal is generated by the shutter release signal generating circuit 22 and sent to the controller 17. If the pushbutton 8 is not pushed, the light projecting means 6, specifically the light emitting element 12, projects light toward the subject 23 to be photographed through the projecting lens. The light reflected from the remote subject 23 is received by a light detecting element 13 of the light detecting means 7. If the remote subject is for example 3 m from the camera 1, the reflected light is received by the light sensor element 13d. The output from the light sensing element 13d is received by the operation circuit 16 and then sent as a lens positioning signal to the controller 17. According to the lens positioning signal, the controller 17 causes the driver 18 to rotate the motor 19, moving spirally and thus axially the objective lens 2 to the lens position S4 (3.14 m). As is shown in FIG. 3 and described previously, the objective lens 2 positioned at the lens position S4 can correctly focus on a subject in a distance range between 2.32 m and 4.95 m because of the depth of field thereof. Therefore, the object lens 2 can well focus the remote subject 23 at a subject distance 3.0 m.

After the objective lens 2 has automatically been adjusted to focus on the remote subject 23, the shutter button 5 can be fully depressed. For an actual exposure, the shutter button 5 is depressed fully to cause first the light measuring circuit 25 and the A/D converter 26 to detect the brightness of the subject 23. If a brightness level higher than a predetermined level is detected, the shutter is actuated under the control of an automatic exposure control system which is well known in the art and, therefore, a description is not needed. In such a way, an exposure is completed.

On the other hand, if the detected brightness level is lower than the predetermined level, the controller 17 provides the connecting line 27 with an H level signal. As a result, the AND circuit 28 receives three H level signals from the controller 17, the infinity signal generating circuit 21 through the inverter 29, and the shutter release signal generating circuit 5, thereby actuating the strobe trigger circuit 30 when the shutter release button is fully depressed so as to trigger the strobe. In this way, a flash exposure is made.

When photographing a landscape as a subject of which the subject distance is generally infinity, the shutter button 5 is depressed half way while the push button 8 is pushed. Consequently, the controller 17 receives an infinity signal from the infinity signal generating circuit 21 upon receiving a shutter release signal from the shutter release signal generating circuit 22. Upon receipt of the shutter release signal and the infinity signal, the controller 17 causes the driver 18 to rotate the motor 19 so as automatically to move the objective lens 2 to the lens position S6, without detecting the distance of the subject. At the end of movement of the objective lens 2, the shutter button 5 is allowed to be fully depressed. If in fact the shutter button 5 is fully depressed, the light measuring circuit 25 and the a/D converter are actuated to detect the brightness of the subject. When a brightness level higher than the predetermined level is detected, the shutter is automatically actuated under the control of the automatic exposure control system so as to make a sharp image of the subject at infinity.

When the shutter button 5 is depressed while the pushbutton 8 is pushed, the infinity signal generating circuit 21 generates an H level signal which is reversed to an L level signal by the inverter 29. Therefore, the AND circuit 28, when receiving an H level signal representative of high brightness from the controller 17, acts so as not to actuate the strobe trigger circuit 30. Thus, when photographing a subject at infinity, a flash exposure is prevented regardless of the brightness of the subject. This prevention of flash exposure by the pushbutton is effectively realized not only in automatic strobes of the type which flash depending on the brightness of the subject but also in strobes of the type which always flash independently of the brightness of the subject. Therefore, a flash exposure which is of no use for subjects at infinity is automatically avoided.

In the case of an objective lens having an initial lens position to which the objective lens is always returned after every exposure at the infinity lens position S6, no movement of the objective lens takes place when photographing a remote subject at infinity while pushing the pushbutton 8. In this case, a full depression of the shutter release button 5 is allowed by pushing the pushbutton 8. It may be desirable to provide a pre-setting button which is operated before a half depression of the shutter release button, in place of the pushbutton which is operated simultaneously with the shutter release button.

It may also be desirable to detect whether the pushbutton has been operated or not in the distance measurement operation. In this case, the controller could produce a pseudo-infinity signal.

Although the present invention has been fully described by way of a preferred embodiment thereof with reference to the accompanying drawings, it is to be understood that other variations and modifications will be apparent to those skilled in the art. Therefore, unless otherwise such changes and modifications depart from the true scope of the present invention, they should be construed as included therein.

What is claimed is:

1. An automatic focusing camera comprising: distance detecting means for detecting the distance of a subject to be photographed and providing a distance signal;

first lens positioning means for positioning an objective lens to a finite suitable focusing position according to said distance signal;

second lens positioning means for positioning said objective lens at a focusing position suitable for infinity independently from said distance signal; and externally operable means for actuating said second lens positioning means to position said objective lens only at said focusing position suitable for infinity.

2. A camera as defined in claim 1, having a shutter and a manually-actuable shutter release member, said externally-operable means for actuating said second lens positioning means being operable to do so only upon simultaneous manual actuation of said shutter release member and said externally-operable means by a user of the camera.

3. An automatic focusing camera of the type in which an objective lens is selectively adjusted to any of a plurality of suitable focusing positions, said camera comprising:

means for detecting the distance of a remote subject to be photographed and providing a distance signal;

first adjusting means for adjusting said objective lens to one of said plurality of suitable focusing positions according to said distance signal;

second adjusting means for adjusting said objective lens to a focusing position suitable for infinity rather than to one of said plurality of suitable focusing positions; and externally operable means for actuating said second adjusting means to adjust said objective lens only to said focusing position suitable for infinity.

4. A camera as defined in claim 3, having a flash unit attached thereto, and means for preventing triggering of said flash unit when said second adjusting means is actuated.

5. A camera as defined in claim 4, wherein said preventing mans includes an AND circuit and a trigger circuit connected to said AND circuit.

6. A camera as defined in claim 3, having a shutter and a manually-actuable shutter release member, said externally-operable means for actuating said second lens positioning means being operable to do so only upon simultaneous manual actuation of said shutter release member and said externally-operable means by a user of the camera.

7. A camera equipped with an objective lens which is selectively adjustable to suitable focusing positions according to subject distances, said camera comprising:

automatic subject distance detecting means comprising a light projecting means for projecting light to a subject to be photographed and a light receiving means for detecting light reflected from said subject and providing an electric distance signal corresponding to the distance of said subject;

first lens positioning means for positioning said objective lens at one of said suitable focusing positions in which said objective lens has a depth of field such as to include a finite said subject distance to which said distance signal corresponds;

second lens positioning means for positioning said objective lens at a focusing position suitable for infinity rather than at said focusing position for a said finite subject distance; and externally operable means for actuating said second lens positioning means to position said objective lens only at said focusing position suitable for infinity.

8. A camera as defined in claim 7, having a shutter and a manually-actuable shutter release member, said externally-operable means for actuating said second lens positioning means being operable to do so only upon simultaneous manual actuation of said shutter release member and said externally-operable means by a user of the camera.

* * * * *